Nov. 15, 1960 A. E. VOGEL 2,960,349
VEHICLE STABILIZING DEVICE RESPONSIVE TO CENTRIFUGAL FORCE
Filed Jan. 22, 1953 3 Sheets-Sheet 2

INVENTOR.
BY Arthur E. Vogel
ATTORNEY

United States Patent Office 2,960,349
Patented Nov. 15, 1960

2,960,349

VEHICLE STABILIZING DEVICE RESPONSIVE TO CENTRIFUGAL FORCE

Arthur E. Vogel, Columbus, Ohio, assignor, by direct and mesne assignments, of one-half to Dawson-Vogel Engineering Co., Columbus, Ohio, a partnership, one-fourth to Palmer Fultz, Columbus, Ohio, and one-fourth to Warren H. F. Schmieding, Columbus, Ohio Filed Jan. 22, 1953, Ser. No. 332,651

14 Claims. (Cl. 280—112)

This invention relates to stabilizing systems of a type which is particularly useful when applied to vehicles, such as automobiles, buses and trucks and is a continuation-in-part of my co-pending application Serial No. 289,602, filed May 23, 1952, now abandoned.

The conventional motor vehicle is ordinarily provided with springs between the body and the wheels of the vehicles so that such springs will absorb shocks and jars of the vehicle to provide safer and more comfortable riding for the occupants.

When the vehicle is rounding curves, however, the springs at the wheels on the side of the vehicle nearest to the center of the curve push upward on such side of the vehicle due to the fact that energy is stored in such springs by the normal weight of the vehicle. Such upward spring force helps to disturb the stability or actually upset the vehicle when rounding a curve by augmenting the centrifugal force that is concurrently exerted on the vehicle due to the fact that the vehicle is undergoing a change in direction.

One of the objects of this invention is to provide a vehicle stabilizing apparatus which eliminates a force detrimental to stability by decreasing the effect, on the body of the vehicle, of energy normally stored in the springs of the vehicle. The various aspects of the invention by which the spring effect is decreased include confining, compressing and releasing the spring energy exerted on the body of a vehicle at the side thereof nearest the center of the curve which such vehicle is rounding.

Another object of the present invention is to provide a vehicle stabilizing apparatus which prevents the center of gravity of the vehicle from being raised by the upwardly exerted force normally exerted by the springs at the side of the vehicle nearest the center of the curve which the vehicle is rounding.

Still another object of the present invention is to provide a vehicle stabilizing apparatus which actually lowers the center of gravity of the vehicle by decreasing the effect, on the body of the vehicle of energy normally stored in the springs of the vehicle.

Still another object of the present invention is to provide a vehicle stabilizing apparatus which furnishes increased traction at desired wheels when such vehicle is rounding curves.

A further object of the present invention is to provide a vehicle stabilizing apparatus which is concurrently operative with conventional shock absorbers on the vehicle without interfering with the operation of such shock absorbers.

In rounding a curve with a vehicle equipped with springs the side of the vehicle towards the center of the curve tends to rise due to two major forces exerted on the vehicle. One of such forces is the centrifugal force exerted at the center of gravity which is located above the points of resistance. Frictional force is exerted on the wheels by the road, with such force acting in a direction opposite to that of centrifugal force. Hence the two forces comprise a couple which tends to roll the vehicle about its longitudinal axis and which actually raises the side of the vehicle nearest the center of the curve. The intensity of the centrifugal force varies directly with the mass and the square of velocity of the vehicle and inversely with the radius of the curve about which the vehicle is traveling. Hence it may be seen that the only way a driver can lessen centrifugal force is by decreasing velocity or increasing the radius of turn.

The other force which is of major detriment to stability is the force in the normally compressed springs which pushes upwardly at the side of the vehicle nearest the center of the curve. Such portion of the total upwardly exerted spring force serves to augment centrifugal force in disturbing the stability of a vehicle turning at high velocity.

It is well known to the art that the inherent stability of a vehicle may be increased by increasing the dimension between laterally spaced wheels of a vehicle. Such increase effectively makes the vehicle wider relative to its height which makes it more difficult for the upsetting forces to cause the vehicle to turn over when rounding a curve. It is also well known to the art that the inherent stability of the vehicle can be increased by lowering the center of gravity of the vehicle relative to the points of resistance between the wheels and the road. Thus it is seen that the geometrical design of the vehicle will directly affect its roadability and particularly the curve rounding characteristics of the vehicle.

The present invention achieves roadability by decreasing the effect of the upwardly exerted spring force at only the side of the vehicle nearest the center of the curve which the vehicle is rounding. This spring force, which normally acts adversely in curves, is of considerable magnitude. In conventional vehicles, such force is in excess of a thousand pounds at each wheel. To overcome the detrimental effect due to this adverse spring force, I provide the present apparatus to confine, compress, or release the spring energy normally exerted on the body of a vehicle at the side thereof nearest the center of the curve which such vehicle is rounding.

My apparatus is further adapted to act on such spring force at the proper time, and it may be actuated either automatically or manually or by both methods.

Further objects and advantages of the present invention will be apparent from the following description, reference being had to the accompanying drawings wherein preferred forms of embodiments of the present invention are clearly shown.

Figure 1:
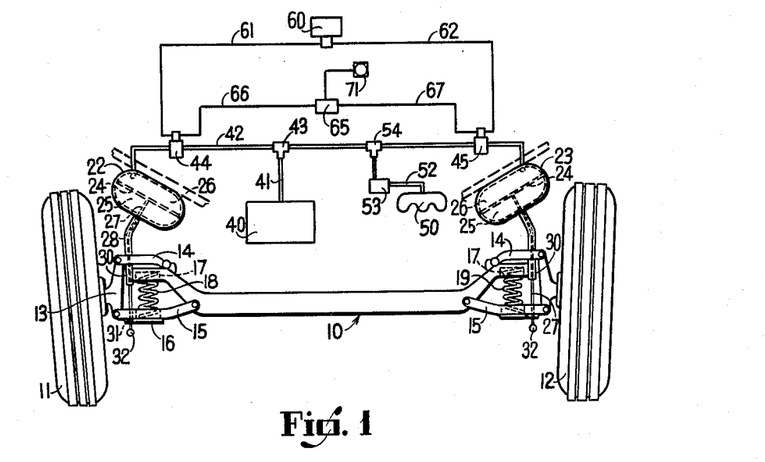
Fig. 1 is a diagrammatic view showing the application of my invention to a motor vehicle wherein such invention is operatively adapted to the front wheels of the vehicle.

Referring to the drawings, and more particularly to Fig. 1, a main body member or frame of a vehicle is indicated generally at 10. Fig. 1 is a view, partially diagrammatic, of the present invention with the wheels and frame appearing essentially as seen from the front of the vehicle. A right front wheel 11 and a left front wheel 12 are provided for the frame or body member 10. Each of such wheels is rotatably mounted on an axle member 13. Two upper links 14 are provided so each pivotally engages the frame and an axle member. In a corresponding manner, two lower links 15 are provided and each pivotally engages the frame and an axle member. The links 14 and 15 serve to mount the wheels to the frame in a manner such that each wheel is free to move essentially vertically relative to such frame. A plate 16 is secured to the underside of each link 15 to serve as a spring retainer. A suitable recess 17 is provided in each side of the frame member 10 for retaining the upper end of a spring. A spring 18 for the right front wheel is retained between the elements 16 and 17. In a like manner, a spring 19 is retained at the left front wheel. With the springs mounted in the manner shown, it will be seen that the springs operatively connect the frame 10 with the respective front wheels 11 and 12. At this point it should be noted that the type of spring and wheel mounting shown in Fig. 1 is illustrative of only one of the possible types of suspensions to which the present invention may be adapted.

To selectively compress the springs 18 and 19, two power cylinders 22 and 23 are provided. These cylinders may be mounted at any suitable place on the vehicle. The power cylinders shown each contain an inner diaphragm 24 separating two chambers 25 and 26. A flexible cable 27 is fastened to the diaphragm 24, and such cable extends out through the cylinder and through the cable housing 28. Such cable housing is fastened at its upper end to the cylinder 22 and at its lower end to the frame 30. The cable 27 is of greater length than the cable housing 30 so that such cable extends out through the end of the housing and down through a hole 31 in the plate 16. A bead 32 is provided on the end of each of the cables 27 and this bead is made of larger diameter than the hole 31 so that when the cable 27 is pulled upwardly due to movement of the diaphragm 24, the bead 32 will engage the plate 16 and thereby move the wheel 11 upwardly relative to the frame 10. With such an arrangement the spring 18 may be confined in its normal partially compressed configuration when the downward force exerted by the weight of the vehicle is decreased. The power cylinder arrangement can be adapted to actually compress a spring by selecting power cylinders of the required power and movement. When the power cylinder is adapted to actually compress the spring, as contrasted with merely confining the spring at normal load configuration, certain functional differences occur. Such differences are clearly described elsewhere in this disclosure.

Figure 2:
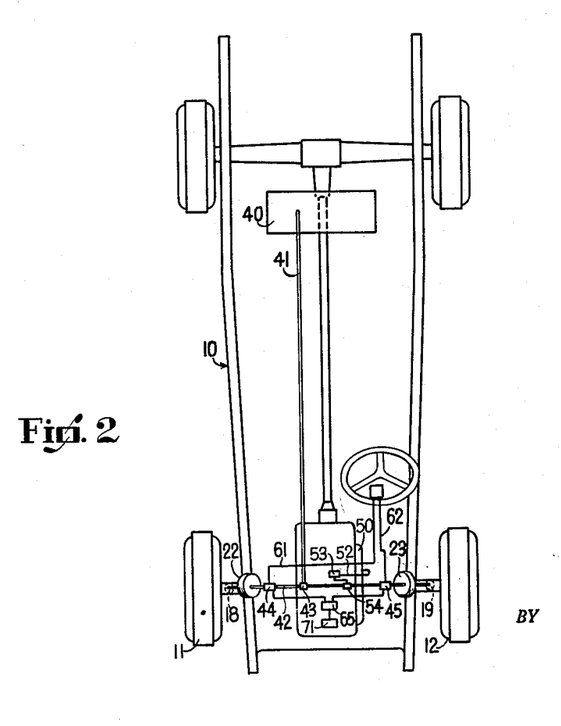
Fig. 2 corresponds with Fig. 1 and shows the plan view of an automobile chassis to which the apparatus of the present invention has been adapted.

To actuate the power cylinder 22 a vacuum source, in the form of a tank 40, is utilized. Such tank is preferably mounted on the rear of the body as seen in Fig. 2. It has been found that it is convenient to position the tank 40 in the upper part of the baggage trunk of the vehicle so that such tank will not take up useful space. A line 41 leads from the vacuum tank and joins a line 42 at the T-connection 43, as seen in Fig. 1. This line 42 extends through the valve 44 to engage the chamber 26 of the power cylinder 22. Line 42 similarly extends in the other direction through the valve 45 to the power cylinder 23. In this manner the two vacuum actuated power cylinders are connected to the source of vacuum and the valves 44 and 45 are properly located to selectively control the connecting and disconnecting of the respective power cylinders with the source of vacuum.

To maintain a constant source of vacuum, I prefer to utilize the engine intake manifold, which is a source of low pressure ordinarily present on the motor vehicle. An engine manifold is shown diagrammatically at 50 in Fig. 1. A line 52 extends through a check valve 53 and then to the line 42 at the T-connection 54. The check valve 53 is of a conventional type which is normally closed but which is adapted to open against line pressure. This valve 53, which allows unidirectional flow only, will open whenever the pressure in the vacuum tank becomes greater than the pressure at the intake manifold 50, and when such valve 53 opens, air will be drawn out of the vacuum tank towards the source of lower pressure at the intake manifold. In this manner the pressure in the vacuum tank 40 is continually and automatically maintained at a desired low level. As has been previously stated, actuation of the power cylinder 22 is controlled by opening and closing the valve 44, and likewise, actuation of the other power cylinder 23 is accomplished by opening and closing the valve 45. For this purpose, I prefer to use solenoid operated valves, so that a driver of a vehicle can selectively operate either the valve 44 or the valve 45 by manual actuation of the manual anticipator 60. This anticipator 60 is essentially a three-way switch with a right, a left, and a neutral position. The electrical connection between the manual anticipator 60 and the valves 44 is provided by the wire 61. A similar connection leads to the valve 45 in the form of the wire 62.

To automatically and selectively open the valves 44 and 45, a detector unit 65 is shown connected to the valves 44 and 45, by the lines 66 and 67, respectively. This detector unit 65 utilizes mercury switches, in the preferred embodiment, so that when the vehicle is rounding a curve centrifugal force will operate on the mercury and cause it to make the electrical contact necessary to energize the desired solenoid of the valve. Therefore, if the vehicle is curving to the right and it is desirable to confine energy in the right spring 18 the detector unit 65 will respond to the action of centrifugal force exerted thereon, and energize the solenoid of valve 44 and thereby open such valve so the right power cylinder 22 will be actuated by vacuum. Similarly, when the vehicle is curving to the left, the detector unit 65 will energize the solenoid of valve 45 and thereby actuate the left power cylinder 23 to compress the spring 19 on the left side of the vehicle. Although I prefer to make the detector unit 65 of the mercury switch type, various other apparatuses which are responsive to the action of centrifugal force can be used.

In addition, I prefer to make the detector unit 65 of a multiple stage type so that the sensitivity of the unit to centrifugal force can be automatically varied in response to variations in the velocity of the vehicle. Such variability of sensitivity of the detector provides means for compensating for, at higher speeds, the time delay encountered during operation of the vacuum actuated power cylinders. At higher speeds, a relatively high degree of detector sensitivity is advantageous so that the springs are confined or compressed before the vehicle has proceeded very far into a curve. At an early stage in rounding a curve a vehicle will not yet have experienced any violent change of direction and the centrifugal force will be low in magnitude. Hence the detector unit should then have a high degree of sensitivity. At slower speeds, however, it is advantageous to have relatively low detector sensitivity so that the stabilizing apparatus will not be unnecessarily actuated when the vehicle is being turned at slow speeds. For example, when a vehicle is being turned into a driveway at a slow speed it is disadvantageous to have the inner front spring compressed or the front bumper of the vehicle may then be caused to strike the ramp of the driveway. In addition, unnecessary actuations of the stabilizing unit at slow speeds will subject such unit to unnecessary wear.

One method of providing variable sensitivity for the detector unit 65 consists of utilizing a high speed mercury switch and a low speed mercury switch in the detector unit. The high speed mercury switch is of a relatively high sensitivity and caused, by the governor 71, to be operative only at higher vehicle velocities. The low speed mercury switch is of a relatively low sensitivity and caused, by the governor 71, to be operative only at lower vehicle velocities.

Although the detector unit just described is of a two stage type, it should be noted that the number of stages utilized is merely a matter of choice, and the sensitivity of the detector unit 65 can be varied in response to changes in vehicle velocity in various other ways without departing from the present inventive concept.

Figures 15, 16, 17, 19:
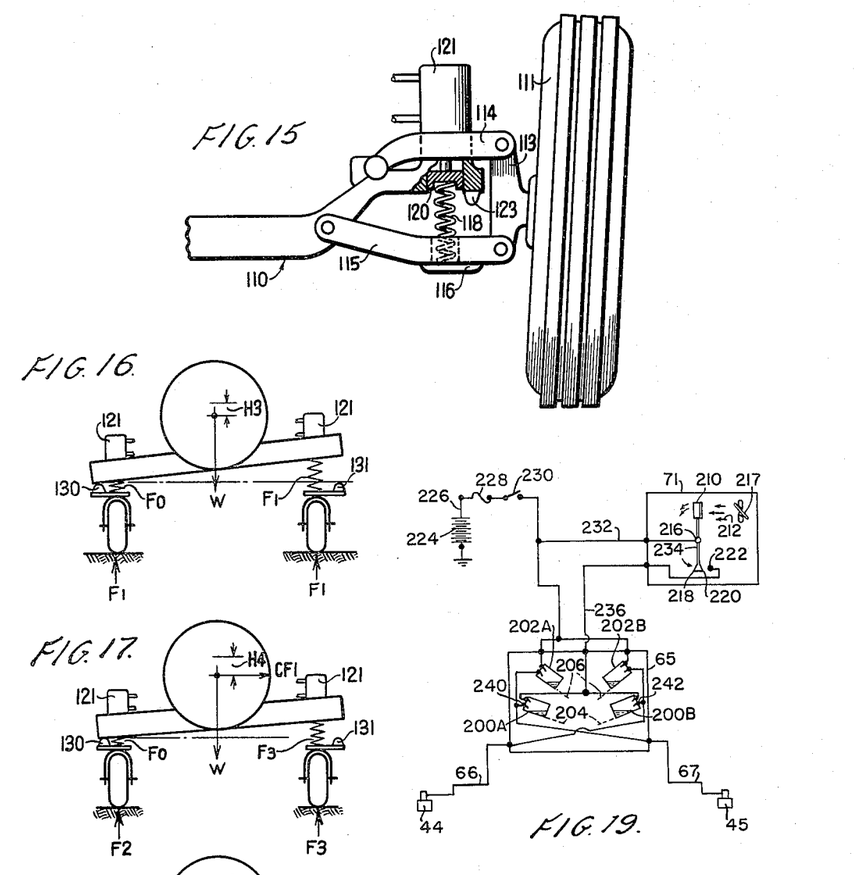
Fig. 15 is a partial diagrammatic view showing the application of a third aspect of my invention to a motor vehicle.
Fig. 16 is a diagrammatic view showing a vehicle similar to that of Figs. 6, 7 and 8 but which has been provided with the third aspect of the present invention different from that adapted to the vehicle of Figs. 9, 10 and 11 and the vehicle of Figs. 12, 13 and 14. The spring geometry shown is present in the vehicle when such vehicle is in the position, relative to the curve, shown in Fig. 3.
Fig. 17 is a front diagrammatic view showing the spring geometry of the vehicle of Fig. 16 when such vehicle is in the position, relative to the curve, shown in Fig. 4.
Fig. 19 is a diagrammatic view of a detector unit comprising a portion of the control system of the present invention.

Reference is next made to Fig. 19 which diagrammatically illustrates a combined detector unit 65 and a sensitivity governor 71 comprising a portion of the control apparatus of Fig. 1.

The detector unit includes sensitive high speed mercury switches 200A and 200B and non-sensitive low speed mercury switches 202A and 202B.

The mercury supporting surfaces of the high speed mercury switches 200A and 200B are inclined at a relatively low angle relative to the horizontal as is indicated by an axis 204 and mercury switches 202A and 202B are inclined at a relatively high angle relative to the horizontal as indicated by an axis 206.

With reference to governor 71, a vane 210 is disposed in an air stream 212 produced by a radiator fan 217, said fan being of the conventional type mounted behind the radiators of present day vehicles. Vane 210 is pivotally mounted to the frame of a vehicle at a pivot 216 and is normally maintained in the vertical disposition illustrated by a weight 218. When the velocity of air stream 212 is increased, beyond a predetermined velocity, vane 210 will be moved to the left whereby a contact 220 on the bottom of the vane is caused to bridge a stationary contact 222. This closes the circuit to one of the valves 44 or 45 assuming the contacts of one of the respective mercury switches 200A or 200B are bridged via battery 224, wire 226, fuse 228, on-off switch 230, wire 232, vane shaft 234, contacts 218 and 220, wire 236, the contacts 240 of switch 200A or the contacts 242 of switch 200B, and wire 67 or 66 to one of the valves 44 or 45.

In view of the above it will be understood that if the vehicle enters a curve at relatively high speed whereby air stream 212 is at a relatively high velocity and contacts 218–220 of governor 71 are bridged, then one of the mercury switches 200A or 200B, being highly sensitive, will quickly energize a respective valve 44 or 45 whereby the previously described confining force is applied to the spring means nearest the center of the curve before the vehicle has actually started to lean outwardly. Hence, undesirable transition sensations at curve entry are avoided and a much less confining force is required to stabilize the vehicle than would be required if the vehicle were permitted to lean outwardly before the confining force is applied.

When the vehicle is traveling at a relatively slow speed, air stream 212 will be below the previously mentioned predetermined velocity whereby vane 210 will remain in the position illustrated such that contacts 220–222 are maintained open. Hence sensitive mercury switches 200A and 200B are maintained inoperative. Since, however, the low speed non-sensitive mercury switches 202A and 202B are not in circuit with governor 71 these switches remain operative and can function to energize a respective valve 44 or 45 via battery 224, wire 226, fuse 228, on-off switch 230, wire 232, non-sensitive mercury switch 202A or 202B, and wire 67 or 66 connected to a respective valve 45 or 44.

Hence it will be understood that the low speed mercury switches 202A and 202B, due to the relatively high incline of their mercury supporting surfaces, will not unnecessarily actuate the valve means when the vehicle is caused to lean at slow speeds such as occurs when the vehicle is turned into a driveway.

The low speed mercury switches 202A and 202B will, however, be bridged when a definite magnitude of centrifugal force is imposed upon them and they will therefore function to actuate valve means 44 and 45 when the vehicle is negotiating a curve at slow speeds.

It should be pointed out that the axes 204 and 206 extend transversely of the longitudinal axis of the vehicle. The switches 200A and 202A are inclined upwardly towards the right side of the vehicle, as viewed from the front, and the switches 200B and 202B are inclined upwardly towards the left side of the vehicle, as viewed from the front. With this orientation the mercury switches 200A and 202A will control the valve means 45 that controls the flow to the confining means at the left front spring means of the vehicle and the mercury switches 200B and 202B will control the valve means 44 that controls the flow to the confining means at the right front spring means of the vehicle.

It should be noted that although I prefer to apply this invention to only the front wheels of a vehicle, the present apparatus can readily be modified to operate at both the front and rear wheels without departing from the spirit of the present invention. In such modification, the springs at both of the wheels at the side of the vehicle towards the center of the curve can be operatively affected. That is to say, the effect of the spring energy can be simultaneously decreased at the front inside wheel and at the rear inside wheel of the vehicle in rounding a curve.

I prefer to use the two wheel aspect of the invention described herein and shown in the drawings as there are certain advantages incident to operating at only either the left front wheel or only the right front wheel at a given time. For example, when only the right front spring is affected, such spring is no longer called upon to bear its normal portion of the total weight of the vehicle. As a result, the right rear spring and the left front spring are called upon to bear more than their normal share of the weight of the vehicle. When this happens the traction at the right rear wheel is advantageously increased. Such wheel, in the case of ordinary vehicle suspensions, is robbed of traction when the vehicle is rounding a curve. With the present invention, however, traction is beneficially maintained at the right rear wheel.

Figures 3, 4, 5, 6, 7, 8, 9, 10, 11, 12, 13, 14:
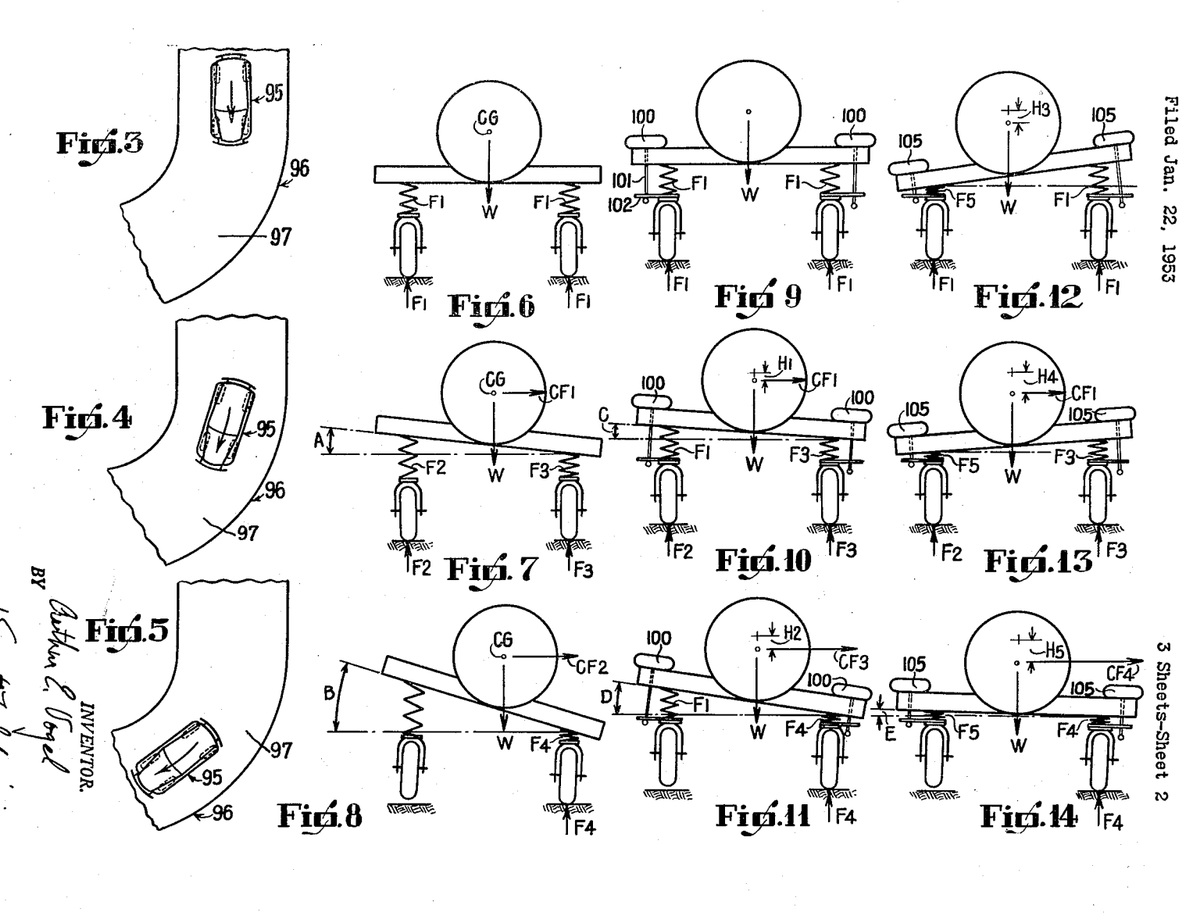
Fig. 3 is a top view of a vehicle approaching a curve.
Fig. 4 is a top view of the vehicle of Fig. 3 after it has entered or started to round said curve.
Fig. 5 is a top view of the vehicle of Figs. 3 and 4 after such vehicle has progressed further around the curve.
Fig. 6 is a front diagrammatic view showing the spring geometry of a vehicle in the position, relative to the curve, corresponding to that of Fig. 3.
Fig. 7 is a front diagrammatic view showing the spring geometry of the vehicle of Fig. 6 after the vehicle has reached the position, relative to the curve, shown in Fig. 4.
Fig. 8 is a front diagrammatic view showing the spring geometry of the vehicle of Fig. 6 after such vehicle has reached the position, relative to the curve, shown in Fig. 5.
Fig. 9 is a front diagrammatic view showing the spring geometry of a similar vehicle to that of Figs. 6, 7 and 8 but which has been provided with the present invention. Such vehicle is in the position, relative to the curve, shown in Fig. 3.
Fig. 10 is a front diagrammatic view showing the spring geometry of the vehicle of Fig. 9 when such vehicle is in the position, relative to the curve, shown in Fig. 4.
Fig. 11 is a front diagrammatic view showing the spring geometry of the vehicle of Fig. 9 when such vehicle has progressed farther around the curve than the position shown in Fig. 5.
Fig. 12 is a diagrammatic view showing a vehicle similar to that of Figs. 6, 7 and 8 but which has been provided with a second aspect of the present invention different from that adapted to the vehicle of Figs. 9, 10 and 11. The spring geometry shown is present in the vehicle when such vehicle is in the position, relative to the curve, shown in Fig. 3.
Fig. 13 is a front diagrammatic view showing the spring geometry of the vehicle of Fig. 12 when such vehicle is in the position, relative to the curve, shown in Fig. 4.
Fig. 14 is a front diagrammatic view showing the spring geometry of the vehicle of Fig. 12 when such vehicle has progressed farther around a curve than the position of the vehicle in Fig. 11.

The stabilizing effects of the present invention may best be understood by referring to the Figs. 3 through 14 and 16 through 18 of the drawings wherein vehicles employing the present invention are diagrammatically illustrated. Each of these front views shows the geometrical configuration of the spring relative to the frame or body of the particular vehicle. In this figures, vehicles on which the present invention has been installed are functionally compared with a conventional type of vehicle. Figs. 3, 4 and 5, respectively, show a vehicle 95 at successive stages in rounding a curve indicated generally at 96.

Figs. 6, 7 and 8 show a conventional vehicle in three succeeding views. Fig. 6 shows the spring and frame configuration of such vehicle approaching a curve in the position of Fig. 3. In this view it is seen that the weight of the vehicle is indicated by the vector W. The force of the weight W may be thought of, for the purpose of this disclosure, as acting downwardly at the center of gravity indicated by CG in the figures. When the vehicle is proceeding in a straight direction, as shown in Fig. 3 and in the diagrammatic view Fig. 6, the two forward springs will each bear an equal portion of the total weight of the vehicle, and, as a consequence, each of these forward springs will be compressed downwardly by the body and will each, in turn, exert an upward force F1 upon the body of the vehicle. Correspondingly, at each forward wheel of the vehicle the road, indicated generally at 97, will push upwardly on each wheel with a force represented by the vector F1 which is equal to the force in the spring. As the vehicle proceeds into the curve to the position shown in Fig. 4, the body of the vehicle will tend to swing outwardly away from the center of the curve, due to centrifugal force CF1, so that the front view will appear as seen in Fig. 7. The configuration of the frame relative to the springs has been changed in the respect that the body of the vehicle has been rotated about its longitudinal axis through an angle indicated at A in Fig. 7. At this position, the left forward wheel of the vehicle will be carrying a greater portion of the weight W than was the case when the vehicle was proceeding in a straight path. Correspondingly, the right forward wheel will be carrying a lesser portion of the weight of the vehicle. As a consequence, the road will then be exerting a force, represented by the vector F3, at the left front wheel, and a second lesser force represented by the vector F2 at the right front wheel. At the same time, the force in each of the two front springs will be equal to the force exerted upwardly on the corresponding front wheel by the road, and such spring forces are likewise indicated by F3 and F2, respectively. A significant factor to be noted at this point, is, that in the case of this conventional vehicle, the spring at the right front wheel has expanded upwardly, thereby expending some of the energy that had initially been stored in such spring, with such energy being expended in raising the side of the vehicle nearest the center of the curve, thereby augmenting the upsetting tendency present due to the centrifugal force CF1.

Fig. 8 diagrammatically shows the spring configuration, relative to the frame, of the same conventional vehicle of Figs. 6 and 7 with such vehicle being in a position farther around the curve, as shown in Fig. 5, and where the centrifugal force CF2 is of such magnitude that the inner right wheel of the vehicle has broken contact with the ground and such vehicle is approaching a state of unstable equilibrium. At this point the vehicle is close to the position at which it will upset. In the position of Fig. 8 the front left wheel will be carrying a greater proportion of the total weight W than was carried by such wheel when the vehicle was in the earlier stages shown in the Figs. 6 and 7. Therefore the ground will be pushing upwardly on such right wheel with a greater force which is represented by the vector F4 and, correspondingly, the spring of this wheel will exert a force of F4 upwardly on the body of the vehicle. At the right front wheel, however, where ground contact has been broken, the ground will not be exerting any force upwardly on the wheel and the corresponding right front springs will no longer be exerting any force upwardly on the body. Hence it will be seen that all of the energy, which was originally confined in the spring due to the weight of the vehicle, has been expended. Such spring energy was expended in augmenting the centrifugal force in rotating the body of the vehicle through the angle B of Fig. 8. The work done by such spring, in expanding from a compressed to a normal state, will be equal to the product of the average force exerted by the spring and the distance that the spring was originally compressed from its normal length. It is readily seen that the force exerted by this spring is detrimental to stability and that the magnitude of the force is significant, when it is considered that the force normally stored in such spring, due to the weight of the vehicle being carried thereby, is well over a thousand pounds in conventional vehicles. In Figs. 9, 10 and 11, respectively, a second vehicle is shown on which the apparatus of the present invention has been installed. These three succeeding views show the same vehicle in various stages of rounding a curve, with such stages corresponding to Figs. 3, 4 and 5, respectively. Two power cylinders indicated at 100 are fastened to the frame of the vehicle. These power cylinders are each adapted to confine the normal energy in one of the front springs on the vehicle by means of the cables 101 and the plates 102. In Fig. 9 the power cylinder 100 has been energized so that the bead on the end of the cable 101 has been pulled upwardly into contact with the plate 102 so that the right front spring is thereby prevented from returning to its normal uncompressed length. Here again, as in the case of Fig. 6, the road is exerting a force upwardly on each wheel which is represented by the vector F1. Correspondingly, the force exerted upwardly on the frame by each of the front springs will also be equal in magnitude to F1.

In Fig. 10 the vehicle in Fig. 9 is shown in a position, relative to the curve, corresponding to that of Fig. 4. Due to the centrifugal force, represented by the vector CF1, a greater portion of the weight W will be shifted to the left wheel, and consequently a lesser portion of the weight W will be borne by the right wheel. The force with which the road pushed upwardly on the left wheel is represented by the vector F3, and, correspondingly, the force pushing upwardly on the right wheel is represented by the vector F2. In this position, the left side of the body has compressed the spring at the left front wheel downwardly so that the force exerted upwardly by such spring will be equal to F3. The force in the right front spring, however, will still be equal to F1, which is the same as the force exerted by the spring before the vehicle entered the curve. This force remains constant due to the fact that the energized power cylinder 100 serves to confine the front right spring in its normally compressed configuration.

Fig. 11 shows the same vehicle of Figs. 9 and 10 after it has proceeded to a position farther around the curve than the position of the vehicle of Fig. 5. With the vehicle in this position, the spring at the left front wheel will be even further compressed due to the increased portion of the total weight that such spring is then bearing. The force in this spring will be equal to the force with which the ground is pressing upwardly on the front left wheel with such ground force being represented by the vector F4. As may be seen in Fig. 11, the front right spring is still retained at its normally compressed length and the force in such spring will still be equal to F1. Here again the vehicle is at a position in the curve where the front right wheel has just broken ground contact and the vehicle is approaching a position of unstable equilibrium. In this instance, however, the inner wheels of the vehicle will break ground contact at a position farther around the curve than was the case with the vehicle of Fig. 8. Such is true because the vehicle of Fig. 11 is provided with the present invention and can therefore withstand greater centrifugal force without breaking ground contact at the inner wheels. The significant thing to be noted here, however, is that the energy normally confined in the spring by the weight of the vehicle has been confined throughout the rounding of the curve and such spring has been prevented from expanding, and from doing work. Hence the front right spring has not been permitted to augment the centrifugal force and therefore it has been eliminated as a detrimental effect to stability. In addition, the frame of the vehicle of Fig. 11 has been rotated about its longitudinal axis to an angle indicated at D which is a lesser angle of rotation than the angle B through which the previously described vehicle was rotated in Fig. 8. This means that the second described vehicle will provide additional advantages for stability in that, in the case of the second vehicle, the center of gravity CG has been kept lower by preventing the right front spring from elongating. When the vehicle is in the position of Fig. 10 the center of gravity will actually have been lowered, relative to the normal position of the center of gravity. Due to the fact that the left front of the frame has then been compressed downwardly, the center of gravity is lowered a proportional amount which is indicated at H1, in Fig. 10. At the position in the curve where the right front wheel of the vehicle is just breaking ground contact, as seen in Fig. 11, the center of gravity will still be maintained lower than normal, thereby increasing the inherent stability of the vehicle and allowing the right front wheel to remain in contact with the ground for a farther distance around the curve than was the case with the unstabilized vehicle. The distance which the center of gravity is lowered below the normal position is indicated at H2 in Fig. 11. Hence it is seen that when the present invention is adapted to a vehicle the center of gravity is lowered as the vehicle progresses around a curve, and such lowering increases as the left front wheel spring is progressively compressed. The center of gravity will be at its lowest point when the left front spring has been completely compressed and while the right front wheel of the vehicle is still on the ground.

In Fig. 12 a third vehicle is shown and such vehicle is essentially the same as the two former vehicles just described except that the power cylinders 105 are adapted to completely compress the springs. At this point it should be remembered that, in the case of the vehicle of Figs. 9, 10 and 11 the power cylinders 100 were adapted to merely confine the springs at their normally compressed configuration. Hence when the vehicle of Fig. 12 is proceeding in a straight direction as shown in Fig. 3, and before entering a curve, the front right power cylinder may be actuated to completely compress the front right spring. In Fig. 12, here again the force exerted upwardly by the ground on each front wheel is equal to the force indicated by the vector F1. The corresponding force in the left front spring is also equal to F1, but the force in the spring at the right front wheel is equal to some greater force F5 due to the fact that the power cylinder 105 has completely compressed the spring at such right front wheel.

In Fig. 13 the same vehicle is shown in the position, relative to the curve, of Fig. 4. At this position, due to the action of centrifugal force CF1, a greater portion of the weight W is carried by the left front wheel and the ground is pushing upwardly on such wheel with a force designated by the vector F3. The force in the spring of such wheel is also equal to F3. At the right front wheel the ground is pushing upwardly with a lesser force indicated by the vector F2, but the force in the spring at the right wheel is, however, still equal to F5 due to the fact that the spring is still being held completely compressed by the power cylinder 105. It will be seen that the center of gravity of the vehicle has been lowered a distance H4 from its original position, with such distance H4 being greater than the initial lowering H3. This increased lowering of the center of gravity results because the left front spring is compressed downwardly due to the shift of weight to the left wheels as the vehicle proceeds around the curve.

In Fig. 14 the same vehicle of Figs. 12 and 13 is shown at a position farther around the curve and at which position the right front wheel has just broken ground contact due to the increased magnitude of centrifugal force CF4. In the case of this vehicle, on which the right front spring is completely compressed at the outset, the position at which the inner wheels of the vehicle first break contact with the ground will be further around the curve than the position of Fig. 5 at which ground contact is lost by the previously described vehicles. Such is true because the vehicle of Figs. 12 through 14 is the most stable in rounding curves. In Fig. 14 the left front wheel is carrying a still greater amount of the weight of the vehicle and therefore the ground is necessarily pushing upwardly on such left front wheel with a force indicated by the vector F4. The corresponding spring at this wheel is also pushing upwardly on the body with a force equal in magnitude to F4. At the right front wheel, however, the spring is still completely confined by the power cylinder 105 so that the force in the spring at such wheel is still equal in magnitude to F5 which is the same magnitude as the force initially exerted by the spring after it had been compressed by the power cylinder 105 and before the vehicle entered into the curve. As the force in such right front spring remains the same throughout the entire rounding of the curve, it will be seen that such spring is prevented from augmenting the centrifugal force. Hence the right front spring is prevented from adversely affecting stability, and from helping to upset the vehicle. At the same time, the center of gravity is appreciably lowered due to the compression of the two front springs, with the right front spring being compressed by the power cylinder, and with the left front spring being compressed by the inertia of the vehicle body. In Fig. 14 it may be seen that the center of gravity of the vehicle has been lowered a total distance H5 with such distance being considerably greater than the distance H2 which is the amount that the center of gravity was lowered in the vehicle of Figs. 9 through 11, as previously described. Thus it is seen that the vehicle illustrated in Figs. 12 through 14, has the right forward spring adapted to be completely compressed instead of merely being confined in normal compressed configuration. Hence such vehicle will present a more stable configuration, throughout the curve, than was presented by the vehicle of Figs. 9 through 11 wherein the right front spring was merely confined.

In addition to the improved stability due to the configuration of the vehicle of Figs. 12 through 14, the stability of such vehicle will also be increased due to the compression of the spring at the right front wheel. When this is done, the potential energy normally stored in the spring will be confined so that such energy will not be expended in doing work detrimental to stability in the manner previously described.

Referring to Figs. 15 through 18, a third aspect of the present invention is illustrated. Fig. 15 is a front view of the left front wheel of a vehicle and the associated apparatus by which the present invention is adapted thereto. A main body member or frame is indicated generally at 110 in Fig. 15. A left front wheel 111 is rotatably mounted to an axle member 113. An upper link 114 and a lower link 115 are each pivotally mounted between the frame and the axle member. These links serve to mount the wheel to the frame in a manner such that the wheel is free to move essentially vertically relative to the frame.

To operatively mount a spring 118 between the wheel and the frame, a plate 116 is secured to the underside of the link 115, with such plate having a suitable recess for retaining the lower end of the spring 118. An upper spring mount 120 is slidably mounted in a substantially vertically disposed guide and power cylinder assembly 121. The guide and cylinder are carried by the frame 110 and the guide serves to slidably carry the upper spring mount 120 when such mount is moved upwardly and downwardly responsive to actuation of the power cylinder.

In Fig. 15 the spring geometry is shown in normal load configuration. That is, the spring 118 is partially compressed by the normal weight of the vehicle, and such spring is further compressible responsive to bumps in the road and inertia forces of the vehicle body. When the power cylinder is actuated, however, the upper spring mount 120 will be moved upwardly with the result that the spring 118 will expand to its normal uncompressed configuration. The effect of the stored energy, on the body of the vehicle, will thereby be eliminated. At the same time, the weight of the vehicle will cause the frame 110 to move downwardly until a bumper 123 engages the plate 116 or the link 115, depending on the location of the bumper.

Figure 18:
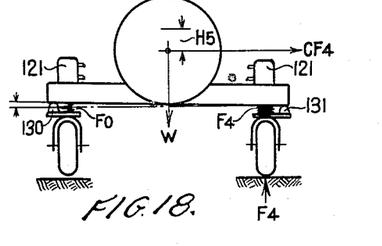
Fig. 18 is a front diagrammatic view showing the spring geometry of the vehicle of Fig. 16 when such vehicle has progressed farther around a curve than the position of the vehicle of Fig. 11.

In Figs. 16 through 18 a third vehicle is shown and such vehicle is essentially the same as the three former vehicles schematically shown in Figs. 6 through 14 except that the cylinders 121 are adapted to release the springs at each of the front wheels. The cylinders 121, of Figs. 16 through 18, have related mechanism as shown in detail in Fig. 15 so that the effect of the stored spring energy can be decreased by releasing the springs rather than confining or compressing the springs as was the case for the previously described vehicles. Hence when the vehicle of Fig. 16 is proceeding in a straight direction, as shown in Fig. 3, and before entering a curve, the right power cylinder may be actuated to release the right front spring. In Fig. 12, here again the force exerted upwardly by the ground on each front wheel is equal to the force indicated by the vector F1. The corresponding force in the left front spring is also equal to F1, but the force in the spring at the right front wheel is equal to F0 due to the fact that the cylinder 121 has released such spring to its normally expanded configuration. At the same time, the bumper 130 will be exerting a force of F1 upwardly on the frame of the vehicle due to the fact that the right side of the vehicle has been lowered to contact the bumper 130 upon release of the spring at the right front wheel.

In Fig. 17 the same vehicle is shown in the position, relative to the curve, of Fig. 4. At this position, due to the action of centrifugal force CF1, a greater portion of the weight W is carried by the left front wheel and the ground is pushing upwardly on such wheel with a force designated by the vector F3. The force in the spring at such wheel is also F3. At the right front wheel the ground is pushing upwardly with a lesser force indicated by the vector F2, but the force in the spring at the right front wheel is, however, still equal to F0 due to the fact that such spring was released by the cylinder 121. It will be seen that the center of gravity of the vehicle has been lowered a distance H4 from its original position, with such distance H4 being greater than the initial lowering H3. This increased lowering of the center of gravity results because the left front spring is compressed downwardly due to the shift of weight to the left wheel as the vehicle proceeds around the curve.

In Fig. 18 the same vehicle of Figs. 16 and 17 is shown at a position further around the curve at which position the right front wheel has just broken ground contact due to the increased magnitude of centrifugal force CF4. In the case of this vehicle, on which the right front spring is released, the position at which the inner wheels of the vehicle first break contact with the ground will be further around the curve than the position of Fig. 5 at which ground contact was lost by the unstabilized vehicle of Fig. 6. In Fig. 18 the left front wheel is carrying a still greater amount of the weight of the vehicle and therefore the ground is necessarily pushing upwardly on such left front wheel with a force indicated by the vector F4. The corresponding spring at this wheel is also pushing upwardly on the body with a force equal in magnitude to F4. At the right front wheel, however, the spring is still released so the force in such spring is still F0 as was the case in Fig. 16 where the spring was first released by the cylinder 121 and before the vehicle entered into the curve.

As such spring remains released throughout the entire rounding of the curve it will be seen that such spring is prevented from augmenting the centrifugal force. Hence the right front spring is prevented from adversely affecting stability, and from helping to upset the vehicle. In Fig. 18 it may be seen that the center of gravity of the vehicle has been lowered a total distance H5 with such distance being considerably greater than the distance H2 which is the amount that the center of gravity was lowered in the vehicle of Figs. 9 through 11, as previously described. Thus it is seen that the vehicle illustrated in Figs. 16 through 18 has the right front spring adapted to be released instead of confined or compressed. Hence the vehicle will present a very stable configuration similar to that of the vehicle of Figs. 12 through 14, and more stable than the configuration of the vehicle of Figs. 9 through 11.

In addition to the improved stability due to the configuration of the vehicle of Figs. 16 through 18, the stability of such vehicle will also be increased as a result of the releasing of the spring at the right front wheel. When such spring is released, the potential energy normally stored in the spring will be released so that such energy will not be expended in doing work detrimental to stability in the manner previously described.

While the forms of embodiments of the present invention as herein disclosed constitute preferred forms, it is to be understood that other forms might be adopted, all coming within the scope of the claims which follow.

I claim:

1. The combination of a vehicle body having supporting wheels and spring means operatively connecting the body with the wheels, two of said wheels being laterally spaced at the forward end of the vehicle, with means operative at each side of the vehicle for only decreasing the effect, on the body, of the energy normally stored in the spring means by force exerted by the body, said second mentioned means being operatively effective at each side between the body and the wheels of the respective sides and only adjacent the forwardly positioned wheels, a control means for selectively controlling said second mentioned means to decrease the effect of spring energy adjacent only one of such forwardly positioned wheels at a time, and a sensitivity governor for the control means.

2. The combination of a vehicle body having supporting wheels and spring means operatively connecting the body with the wheels, with means operative at each side of the vehicle for only decreasing the effect, on the body, of the energy normally stored in the spring means by force exerted by the body, said second mentioned means being operatively effective at each side between the body, and the wheels of the respective side and only adjacent the forwardly positioned wheels, a centrifugally actuated control means adapted to control said second mentioned means only when the vehicle is rounding a curve, said control means being further adapted to selectively control said second mentioned means to decrease the effect of spring energy adjacent only the side of the vehicle nearest the center of such curve, a sensitivity governor for the control means.

3. The combination of a vehicle body having supporting wheels and spring means operatively connecting the body with the wheels, with means operative at each side of the vehicle for only decreasing the effect, on the body, of the energy normally stored in the spring means by force exerted by the body, said second mentioned means being operatively effective at each side between the body and the wheels of the respective side and only adjacent the forwardly positioned wheels, a centrifugally actuated control means adapted to control said second mentioned means only when the vehicle is rounding a curve, said control means being further adapted to selectively control said second mentioned means to decrease the effect of spring energy adjacent only the side of the vehicle nearest the center of such curve, and a sensitivity governor for the control means, said governor being responsive to the speed of the vehicle.

4. The combination of a vehicle body having supporting wheels and spring means operatively connecting the body with the wheels, two of said wheels being laterally spaced at the forward end of the vehicle, with means operative at each side of the vehicle for only confining a portion of the potential energy normally stored in the spring means by force exerted by the body, said second mentioned means being operatively effective at each side between the body and the wheels of the respective side and only adjacent the forwardly positioned wheels, a control means for selectively controlling said second mentioned means to confine spring energy adjacent only one of such forwardly positioned wheels at a time, a sensitivity governor for the control means, said governor being responsive to the speed of the vehicle.

5. The combination of a vehicle body having supporting wheels and spring means operatively connecting the body with the wheels, with means operative at each side of the vehicle for only confining a portion of the potential energy normally stored in the spring means by force exerted by the body, said second mentioned means being operatively effective at each side between the body and the wheels of the respective side and only adjacent the forwardly positioned wheels, a centrifugally actuated control means adapted to control said second mentioned means only when the vehicle is rounding a curve, said control means being further adapted to selectively control said second mentioned means to confine spring energy adjacent only the side of the vehicle nearest the center of such curve, and a sensitivity governor for the control means, said governor being responsive to the speed of the vehicle.

6. The combination of a vehicle body having supporting wheels and spring means operatively connecting the body with the wheels, two of said wheels being laterally spaced at the forward end of the vehicle, with a power means operative at each side of the vehicle for only compressing the spring means at each side beyond normal load configuration, said power means being operatively effective at each side between the body and the wheels of the respective sides and only adjacent the forwardly positioned wheels, a control means for selectively controlling the power means to compress the spring means adjacent only one of such forwardly positioned wheels at a time, a sensitivity governor for the control means.

7. The combination of a vehicle body having supporting wheels and spring means operatively connecting the body with the wheels, with a power means operative at each side of the vehicle for only compressing the spring means at each side beyond normal load configuration, said power means being operatively effective at each side between the body and the wheels of the respective side and only adjacent the forwardly positioned wheels, a centrifugally actuated control means adapted to control the power means only when the vehicle is rounding a curve with such control means being further adapted to selectively control the power means to compress the spring means adjacent only the side of the vehicle nearest the center of such curve, and a sensitivity governor for the control means, said governor being responsive to the speed of the vehicle.

8. The combination of a vehicle body means having supporting wheel means and spring elements operatively connecting the body means with the wheel means; a spring releasing means for releasing a spring element at each side of the vehicle for selectively releasing energy normally stored in the spring element by force exerted thereon by the body means, said spring releasing means being operatively effective at each side between the body means and at least one wheel of the respective side, said spring releasing means comprising a member operatively associated with one of said spring elements; means for moving said member relative to said one means; a source of energy carried by said body means and connectable with said member moving means; means for connecting and disconnecting said member moving means with said source of energy; a centrifugally actuated control means for operating said spring releasing means when the vehicle is rounding a curve, said control means being adapted to selectively control said spring releasing means to release spring energy at only the side of the vehicle nearest the center of such curve; and a sensitivity governor for the control means, said governor being responsive to the speed of the vehicle.

9. Apparatus defined in claim 8 characterized by said control means including electrically actuated means for starting and stopping operation of said spring releasing means, a source of electrical energy carried by the vehicle and connectable with said electrically actuated means, and a mercury switch connected between said source and said electrically actuated means.

10. Apparatus defined in claim 8 characterized by said fluid actuated means including a cylinder carried by one of said first and second mentioned means and a movable member exposed to the interior of said cylinder and operatively connected to said spring means; and said control means including electrically actuated means for starting and stopping operation of said spring releasing means, a source of electrical energy carried by the vehicle and connectable with said electrically actuated means, and a mercury switch connected between said source and said electrically actuated means.

11. Apparatus defined in claim 8 characterized by said spring element being formed as a coil spring; said spring releasing means including a cylinder carried by one of said first and second mentioned means, said spring mounting member being movably exposed to the interior of said cylinder; and said control means including electrically actuated means for starting and stopping operation of said spring releasing means, a source of electrical energy carried by the vehicle and connectable with said electrically actuated means, and a mercury switch connected between said source and said electrically actuated means.

12. The combination of a vehicle body means having supporting wheel means and spring elements operatively connecting the body means with the wheel means with a spring releasing means for releasing a spring element at each side of the vehicle for selectively releasing energy normally stored in the spring element by force exerted by the body, said spring releasing means being operatively effective at each side between the body means and at least one wheel of the respective side, said spring releasing means comprising a member operatively associated with one of said spring elements, means for moving said member relative to said one means, a source of energy carried by said body means and connectable with said member moving means, means for connecting and disconnecting said member moving means with said source of energy, a centrifugally actuated control means for operating said spring releasing means when the vehicle is rounding a curve, said control means being adapted to selectively control said spring releasing means to release spring energy at only the side of the wheel nearest the center of such curve, a sensitivity governor for the control means, said governor being responsive to the speed of the vehicle, said spring releasing means including a piston and cylinder operatively connected to said spring means.

13. The combination of a vehicle body means having supporting wheel means and spring elements operatively connecting the body means with the wheel means with a spring releasing means for releasing a spring element at each side of the vehicle for selectively releasing energy normally stored in the spring element by force exerted by the body, said spring releasing means being operatively effective at each side between the body means and at least one wheel of the respective side, said spring releasing means comprising a member operatively associated with one of said spring elements, means for moving said member relative to said one means, a source of energy carried by said body means and connectable with said member moving means, means for connecting and disconnecting said member moving means with said source of energy, a centrifugally actuated control means for operating said spring releasing means when the vehicle is rounding a curve, said control means being adapted to selectively control said spring releasing means to release spring energy at only the side of the vehicle nearest the center of such curve, a sensitivity governor for the control means, said governor being responsive to the speed of the vehicle, said spring element being formed as a coil spring; said spring releasing means including a fluid actuated cylinder carried by one of said first and second mentioned means, said spring mounting member being slidably carried in said cylinder.

14. The combination of a vehicle body means having supporting wheel means and resilient means operatively connecting the body means with the wheel means, with releasing means for releasing a resilient means at each side of the vehicle for selectively releasing energy normally stored in the resilient means by force exerted by the body, said releasing means comprising a member operatively associated with one of said resilient means, means containing a pressurized fluid for moving said member relative to said one means, a source of fluid energy carried by said body means and connectable with said member moving means, means for connecting and disconnecting said member moving means with said source of fluid energy, a control means for selectively controlling said releasing means to release energy from said resilient means at only one side of the vehicle at a time, a sensitivity governor for the control means, said governor being responsive to the speed of the vehicle.

References Cited in the file of this patent
UNITED STATES PATENTS

| | | |
|---|---|---|
| 2,115,159 | Dupuy | Apr. 26, 1938 |
| 2,152,938 | Welch | Apr. 4, 1939 |
| 2,260,102 | Freret | Oct. 21, 1941 |
| 2,279,120 | Hurley | Apr. 7, 1942 |
| 2,353,503 | Rost | July 11, 1944 |
| 2,452,267 | Schramm | Oct. 26, 1948 |
| 2,650,108 | Bruce | Aug. 25, 1953 |
| 2,684,254 | Goss | July 20, 1954 |

FOREIGN PATENTS

| | | |
|---|---|---|
| 518,848 | Great Britain | Mar. 8, 1940 |
| 670,361 | Great Britain | Apr. 16, 1952 |
| 456,140 | Italy | Mar. 24, 1950 |